(12) United States Patent
Vilermo et al.

(10) Patent No.: US 11,294,493 B2
(45) Date of Patent: Apr. 5, 2022

(54) METHOD, APPARATUS AND COMPUTER PROGRAM PRODUCT FOR ENTERING OPERATIONAL STATES BASED ON AN INPUT TYPE

(71) Applicant: Nokia Technologies Oy, Espoo (FI)

(72) Inventors: Miikka Vilermo, Siuro (FI); Koray Ozcan, Farnborough (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/147,082

(22) Filed: May 5, 2016

(65) Prior Publication Data
US 2016/0328081 A1    Nov. 10, 2016

(30) Foreign Application Priority Data
May 8, 2015   (EP) .................................... 15166909

(51) Int. Cl.
*G06F 3/041* (2006.01)
*G06F 3/01* (2006.01)
(Continued)

(52) U.S. Cl.
CPC ............ *G06F 3/0416* (2013.01); *G06F 3/016* (2013.01); *G06F 3/017* (2013.01); *G06F 3/16* (2013.01);
(Continued)

(58) Field of Classification Search
CPC ........... G06F 3/0416; G06F 3/16; G06F 3/017
See application file for complete search history.

(56) References Cited

U.S. PATENT DOCUMENTS 6,801,765 B1 * 10/2004 Roo ..................... H04M 1/667
                                                            455/411
8,180,327 B2 * 5/2012 Yang ..................... H04M 1/67
                                                            455/411
(Continued)

FOREIGN PATENT DOCUMENTS

WO     2012/028773 A1    3/2012

OTHER PUBLICATIONS

Extended European Search Report received for corresponding European Patent Application No. 15166909.0, dated Oct. 30, 2015, 6 pages.
(Continued)

*Primary Examiner* — Amy Onyekaba
(74) *Attorney, Agent, or Firm* — Alston & Bird LLP (57) ABSTRACT

A method is provided for providing various operational states based on user input type. In particular, an example method may include providing for operation in a first operational state, receiving a user input, and determining if the user input is of a first input type. A second operational state based on the user input may be determined in response to the user input being of the first input type. Methods may include providing for operation in the second operational state, different from the first operational state, in response to receiving the user input of the first input type, where the second operational state precludes input of a second input type and allows input of a first input type, where the first and second input types are different from one another.

19 Claims, 3 Drawing Sheets

(51) Int. Cl.
    *H04M 1/27*           (2006.01)
    *H04M 1/67*           (2006.01)
    *H04M 1/724*         (2021.01)
    *H04M 1/72466*     (2021.01)
    *G06F 3/16*           (2006.01)

(52) U.S. Cl.
    CPC ............ *H04M 1/271* (2013.01); *H04M 1/67* (2013.01); *H04M 1/724* (2021.01); *H04M 1/72466* (2021.01)

(56) References Cited

U.S. PATENT DOCUMENTS

| | | | | |
|---|---|---|---|---|
| 8,341,557 B2* | 12/2012 | Pisula | G06F 3/04886 | 715/863 |
| 8,447,272 B2* | 5/2013 | Faith | H04W 12/06 | 455/411 |
| 8,749,501 B2* | 6/2014 | Oda | G06F 3/0446 | 345/173 |
| 8,819,812 B1* | 8/2014 | Weber | G06F 21/31 | 726/19 |
| 8,963,889 B2* | 2/2015 | Oda | G06F 3/0416 | 345/179 |
| 9,117,454 B2* | 8/2015 | Ahn | G10L 21/00 | |
| 9,147,275 B1* | 9/2015 | Hyde-Moyer | G06K 9/033 | |
| 9,262,067 B1* | 2/2016 | Bell | G06F 3/017 | |
| 9,619,200 B2* | 4/2017 | Chakladar | G10L 15/22 | |
| 9,866,677 B1* | 1/2018 | Maguire | H04M 1/6075 | |
| 10,134,392 B2* | 11/2018 | Shima | G06F 3/167 | |
| 2005/0219228 A1* | 10/2005 | Alameh | G06F 3/0488 | 345/173 |
| 2007/0036347 A1* | 2/2007 | Teicher | H04M 19/04 | 379/418 |
| 2007/0150842 A1* | 6/2007 | Chaudhri | H04M 1/67 | 715/863 |
| 2008/0229255 A1* | 9/2008 | Linjama | G06F 3/0346 | 715/863 |
| 2009/0167717 A1* | 7/2009 | Wang | G06F 3/0416 | 345/173 |
| 2009/0170553 A1* | 7/2009 | Wang | H04M 1/66 | 455/550.1 |
| 2009/0262078 A1* | 10/2009 | Pizzi | G06F 1/1626 | 345/169 |
| 2009/0296341 A1* | 12/2009 | Eldershaw | G06F 1/1643 | 361/679.43 |
| 2009/0312055 A1* | 12/2009 | Liu | H04W 12/06 | 455/558 |
| 2010/0001967 A1* | 1/2010 | Yoo | H04M 1/0266 | 345/173 |
| 2010/0008523 A1* | 1/2010 | Demuynck | H04M 1/0241 | 381/182 |
| 2010/0123664 A1* | 5/2010 | Shin | G06F 3/0488 | 345/169 |
| 2010/0297946 A1* | 11/2010 | Alameh | H04W 4/08 | 455/41.3 |
| 2010/0306718 A1* | 12/2010 | Shim | G06F 21/32 | 715/863 |
| 2011/0117970 A1* | 5/2011 | Choi | G06F 3/0416 | 455/566 |
| 2011/0214162 A1* | 9/2011 | Brakensiek | G06F 3/167 | 726/4 |
| 2011/0275348 A1* | 11/2011 | Clark | G06F 21/32 | 455/411 |
| 2011/0294467 A1* | 12/2011 | Kim | H04M 3/42195 | 455/411 |
| 2012/0009896 A1* | 1/2012 | Bandyopadhyay | G06F 1/1686 | 455/411 |
| 2012/0053887 A1* | 3/2012 | Nurmi | G06F 3/04817 | 702/150 |
| 2012/0084734 A1* | 4/2012 | Wilairat | G06F 21/629 | 715/863 |
| 2012/0211656 A1* | 8/2012 | Katz | G01S 17/04 | 250/338.1 |
| 2012/0235790 A1* | 9/2012 | Zhao | G06K 9/00288 | 340/5.83 |
| 2012/0245941 A1* | 9/2012 | Cheyer | H04L 63/10 | 704/246 |
| 2013/0002531 A1* | 1/2013 | Krahenbuhl | G06F 3/0416 | 345/156 |
| 2013/0009858 A1* | 1/2013 | Lacey | H04M 1/0245 | 345/156 |
| 2013/0021362 A1* | 1/2013 | Sakurada | G06F 3/167 | 345/589 |
| 2013/0036377 A1* | 2/2013 | Colley | G06F 3/0488 | 715/764 |
| 2013/0057496 A1* | 3/2013 | Hong | G06F 3/0488 | 345/173 |
| 2013/0078966 A1* | 3/2013 | Chang | H04W 4/16 | 455/414.1 |
| 2013/0111408 A1* | 5/2013 | Berus | G06F 16/954 | 715/835 |
| 2013/0201093 A1* | 8/2013 | Kim | G06F 3/03 | 345/156 |
| 2013/0212702 A1* | 8/2013 | Niglio | G06F 21/36 | 726/28 |
| 2013/0226591 A1* | 8/2013 | Ahn | H04W 52/027 | 704/275 |
| 2013/0231755 A1* | 9/2013 | Perek | H01H 13/82 | 700/66 |
| 2013/0283199 A1* | 10/2013 | Selig | G06F 21/74 | 715/781 |
| 2013/0325484 A1* | 12/2013 | Chakladar | G10L 15/22 | 704/275 |
| 2014/0006027 A1* | 1/2014 | Kim | H04M 1/271 | 704/246 |
| 2014/0059365 A1* | 2/2014 | Heo | G06F 1/3206 | 713/320 |
| 2014/0062903 A1* | 3/2014 | Lee | G06F 21/31 | 345/173 |
| 2014/0098063 A1* | 4/2014 | Rojas | H04M 1/67 | 345/175 |
| 2014/0171146 A1* | 6/2014 | Ma | H04M 1/72454 | 455/550.1 |
| 2014/0172373 A1* | 6/2014 | Edwards | G06F 3/011 | 702/189 |
| 2014/0244272 A1* | 8/2014 | Shao | G06F 3/01 | 704/275 |
| 2014/0283142 A1* | 9/2014 | Shepherd | G06F 21/6245 | 726/30 |
| 2014/0317734 A1* | 10/2014 | Valencia | G06F 21/316 | 726/22 |
| 2014/0320674 A1* | 10/2014 | Kuang | H04N 5/23222 | 348/207.1 |
| 2015/0040024 A1* | 2/2015 | Higashibeppu | G06F 3/0488 | 715/741 |
| 2015/0074615 A1* | 3/2015 | Han | G06K 9/00033 | 715/863 |
| 2015/0156308 A1* | 6/2015 | Jang | H04M 1/724 | 455/411 |
| 2015/0242993 A1* | 8/2015 | Raman | G06T 3/40 | 345/589 |
| 2015/0261315 A1* | 9/2015 | Alameh | G06F 3/014 | 345/156 |
| 2015/0340025 A1* | 11/2015 | Shima | G10L 17/22 | 704/246 |
| 2015/0347738 A1* | 12/2015 | Ulrich | G06F 21/35 | 726/17 |
| 2016/0048705 A1* | 2/2016 | Yang | H04W 12/06 | 726/34 |
| 2016/0062591 A1* | 3/2016 | Hwang | G06F 1/1694 | 345/173 |
| 2016/0104001 A1* | 4/2016 | LeBeau | G06F 21/70 | 726/34 |
| 2016/0259459 A1* | 9/2016 | Yang | G06F 3/041 | |
| 2016/0259542 A1* | 9/2016 | Chaudhri | G06F 3/015 | |
| 2016/0302068 A1* | 10/2016 | Choi | G06F 3/016 | |
| 2016/0328094 A1* | 11/2016 | Hwang | G06F 3/04883 | |

(56) References Cited

U.S. PATENT DOCUMENTS

2017/0064062 A1* 3/2017 Lee ........................ H04N 7/186
2017/0193212 A1* 7/2017 Lai .......................... G06F 21/32
2018/0246591 A1* 8/2018 Huijser ................... G06F 3/167

OTHER PUBLICATIONS

International Search Report and Written Opinion received for corresponding Patent Cooperation Treaty Application No. PCT/FI2016/050292, dated Aug. 9, 2016, 13 pages.
Office Action for European Application No. 15166909.0 dated Feb. 12, 2018, 4 pages.

* cited by examiner

METHOD, APPARATUS AND COMPUTER PROGRAM PRODUCT FOR ENTERING OPERATIONAL STATES BASED ON AN INPUT TYPE

TECHNOLOGICAL FIELD

Example embodiments of the present invention relate generally to methods of interacting with a device, and more particularly, a method, apparatus, and computer program product for entering an operational state that restricts the type of input accepted based upon the type of input received to enter the operational state.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become more capable of performing tasks that far exceed a traditional voice call. Mobile devices are becoming portable computing devices that are capable of running a variety of applications and presenting a variety of types of information to a user. As mobile devices may contain personal information which a user wishes to protect, devices may include security features such as disabling, turning off, or locking a display, precluding personal information from being presented, which may be enabled after an elapsed time without the device receiving an input or in response to a user command to lock the display.

SUMMARY

In general, an example embodiment of the present invention provides an improved method of operating a device in an operational state that enables input of a first type while precluding input of a second type. Corresponding apparatus and computer program products are also provided according to other example embodiments.

In particular, the method of example embodiments may include providing for operation in a first operational state, receiving a user input, and determining if the user input is of a first input type. A second operational state based on the user input may be determined in response to the user input being of the first input type. Methods may include providing for operation in the second operational state, different from the first operational state, in response to receiving the user input of the first input type, where the second operational state precludes input of a second input type and allows input of a first input type, where the first and second input types are different from one another.

According to some embodiments, methods may include determining if the user input is of a second input type and determining a third operational state based on the user input in response to the user input being of the second input type. Methods may include providing for operation in the third operational state, different from the first operational state, in response to receiving the user input of the second input type. The third operational state may preclude input of the first input type and allow input of the second input type. The first input type may include an audio input type where the second input type may include a touch input type. The first input type may include a motion input type while the second input type may include a touch input type. The first input type may include a motion input type and the second operational state may provide output in the form of a tactile or haptic output. The second operational state may preclude input of a second input type, but permits input of a third input type and a fourth input type. The second operational state may preclude input of any input type other than the first input type.

According to some embodiments, the first operational state is a locked state, where a transition from the first operational state to the second operational state is performed only in response to a predetermined input sequence of the first input type. The first operational state may be a locked state, where a transition from the first operational state to the third operational state may be performed only in response to user input of the second input type. The second operational state and the third operational state may comprise unlocked operational states that enable user interaction. Methods may optionally determine a context, where determining a second operational state based on the user input and the first input type may include determining a second operational state based on the user input, the first input type, and the context. The second operational state may include at least one input type that is permitted, at least one input type that is precluded, at least one information output type that is permitted, and at least one information output type that is precluded. The at least one information output type that is permitted may include a visual output type, the at least one information output type that is precluded may be an audio output type. The at least one information output type that is permitted may include a haptic output type, where the at least one information output type that is precluded may be a visible output type.

Embodiments of the present invention may provide a computer program product including at least one non-transitory computer-readable storage medium having computer-executable program code instructions stored therein. The computer executable program code instructions may include program code instructions to provide for operation in a first operational state, program code instructions for receiving a user input, and program code instructions for determining if the user input is of a first input type. The computer executable program code instructions may further include determining a second operational state based on the user input in response to the user input being of the first input type and program code instructions for providing for operation in the second operational state, different from the first operational state, in response to receiving the user input of the first input type. The second operational state may preclude input of a second input type and allow input of a first input type, where the second input type is different from the first input type.

According to some embodiments, computer program products may include program code instructions for determining if the user input is of a second input type and determining a third operational state based on the user input in response to the user input being of the second input type. The computer program product may include program code instructions for providing for operation in the third operational state, different from the first operational state, in response to receiving the user input of the second input type. The third operational state may preclude input of the first input type and allow input of the second input type. The first input type may include a motion input type while the second input type may include a touch input type. The first input type may include a motion input type and the second operational state may provide output in the form of a tactile or haptic output. The second operational state may preclude input of a second input type, but permits input of a third input type and a fourth input type. The second operational state may preclude input of any input type other than the first input type.

According to some embodiments, the first operational state is a locked state, where a transition from the first operational state to the second operational state is performed only in response to a predetermined input sequence of the first input type. A transition from the first operational state to the third operational state may be performed only in response to a predetermined input sequence of the third input type. The second operational state and the third operational state may comprise unlocked operational states that enable user interaction. Computer program products of some embodiments may optionally include program code instructions to determine a context, where the program code instructions to determine a second operational state based on the user input and the first input type may include program code instructions to determine a second operational state based on the user input, the first input type, and the context. The second operational state may include at least one input type that is permitted, at least one input type that is precluded, at least one information output type that is permitted, and at least one information output type that is precluded. The at least one information output type that is permitted may include a visual output type, the at least one information output type that is precluded may be an audio output type. The at least one information output type that is permitted may include a haptic output type, where the at least one information output type that is precluded may be a visible output type.

Embodiments of the present invention may include an apparatus including at least one processor and at least one memory including computer program code configured to, with the at least one processor, cause the apparatus to provide for operation in a first operational state, receive a user input, and determine if the user input is of a first input type. The apparatus may be caused to determine a second operational state based on the user input in response to the user input being of the first input type and provide for operation in the second operational state, different from the first operational state, in response to receiving the user input of the first input type. The second operational state may preclude input of a second input type while allowing input of the first input type, and the second input type may be different than the first input type.

According to some embodiments, the apparatus may be caused to determine if the input is of a second input type, determine a third operational state based on the user input in response to the user input being of the second input type, and provide for operation in the third operational state, different from the first operational state, in response to receiving the user input of the second input type. The third operational state may preclude input of the first input type while allowing input of the second input type. The first input type may include an audio input type where the second input type may include a touch input type. The first input type may include a motion input type while the second input type may include a touch input type. The first input type may include a motion input type and the second operational state may provide output in the form of a tactile or haptic output. The second operational state may preclude input of a second input type, but permits input of a third input type and a fourth input type. The second operational state may preclude input of any input type other than the first input type.

According to some embodiments, the first operational state is a locked state, where a transition from the first operational state to the second operational state is performed only in response to a predetermined input sequence of the first input type. A transition from the first operational state to the third operational state may be performed only in response to a predetermined input sequence of the second input type. The second operational state and the third operational state may comprise unlocked operational states that enable user interaction. An apparatus of example embodiments may optionally be caused to determine a context, where causing the apparatus to determine a second operational state based on the user input and the first input type may include causing the apparatus to determine a second operational state based on the user input, the first input type, and the context. The second operational state may include at least one input type that is permitted, at least one input type that is precluded, at least one information output type that is permitted, and at least one information output type that is precluded. The at least one information output type that is permitted may include a visual output type, the at least one information output type that is precluded may be an audio output type. The at least one information output type that is permitted may include a haptic output type, where the at least one information output type that is precluded may be a visible output type.

Embodiments of the present invention may include an apparatus including means for providing for operation in a first operational state, means for receiving a user input, and means for determining if the user input is of a first input type. The apparatus may include means for determining a second operational state based on the user input in response to the user input being of the first input type, and means for providing for operation in the second operational state, different from the first operational state, in response to receiving the user input of the first input type. The second operational state may preclude input of a second input type and allow input of a first input type, where the second input type is different from the first input type.

According to some embodiments, an apparatus may include means for determining if the user input is of a second input type, means for determining a third operational state based on the user input in response to the user input being of the second input type, and providing for operation in the third operational state, different from the first operational state, in response to receiving the user input of the second input type. The third operational state may preclude input of the first input type and allow input of the second input type. The first input type may include an audio input type where the second input type may include a touch input type. The first input type may include a motion input type while the second input type may include a touch input type. The first input type may include a motion input type and the second operational state may provide output in the form of a tactile or haptic output. The second operational state may preclude input of a second input type, but permits input of a third input type and a fourth input type. The second operational state may preclude input of any input type other than the first input type.

According to some embodiments, the first operational state is a locked state, where a transition from the first operational state to the second operational state is performed only in response to a predetermined input sequence of the first input type. A transition from the first operational state to the third operational state may be performed only in response to a predetermined input sequence of the second input type. The second operational state and the third operational state may comprise unlocked operational states that enable user interaction. An apparatus of example embodiments may optionally include means for determining a context, where the means for determining a second operational state based on the user input and the first input type may include means for determining a second operational state based on the user input, the first input type, and the context. The second operational state may include at least one input type that is permitted, at least one input type that is precluded, at least one information output type that is permitted, and at least one information output type that is precluded. The at least one information output type that is permitted may include a visual output type, the at least one information output type that is precluded may be an audio output type. The at least one information output type that is permitted may include a haptic output type, where the at least one information output type that is precluded may be a visible output type.

BRIEF DESCRIPTION OF THE DRAWINGS

Having thus described certain example embodiments of the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
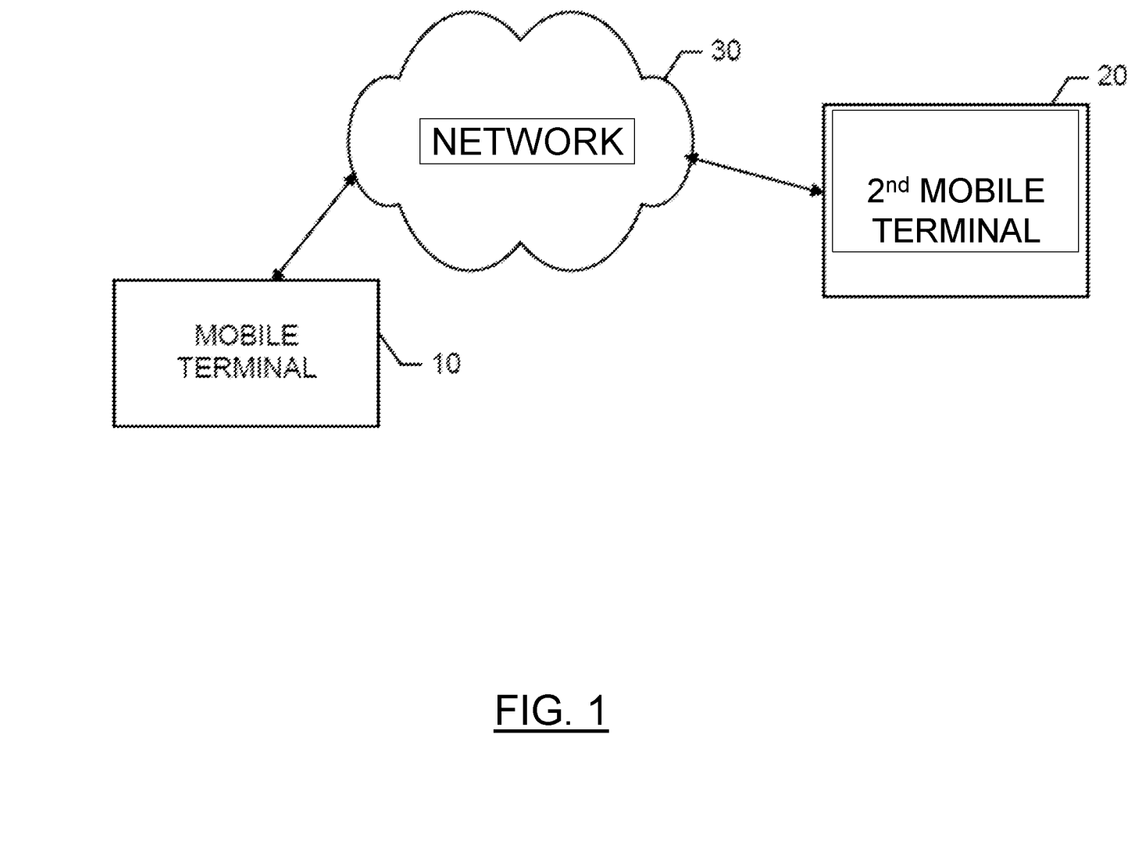
FIG. 1 illustrates a communication system that may be configured in accordance with an example embodiment of the present invention.

A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth® interfaces. A network session may include various types of network communications such as placing/receiving a call, use of an online application (e.g., a social networking application), internet browsing, or the like. As such, FIG. 1 should be understood to be an example of a broad view of certain elements of a system that may incorporate example embodiments of the present invention and not an all-inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals, such as the mobile terminal 10 and the second mobile terminal 20, may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

Figure 2:
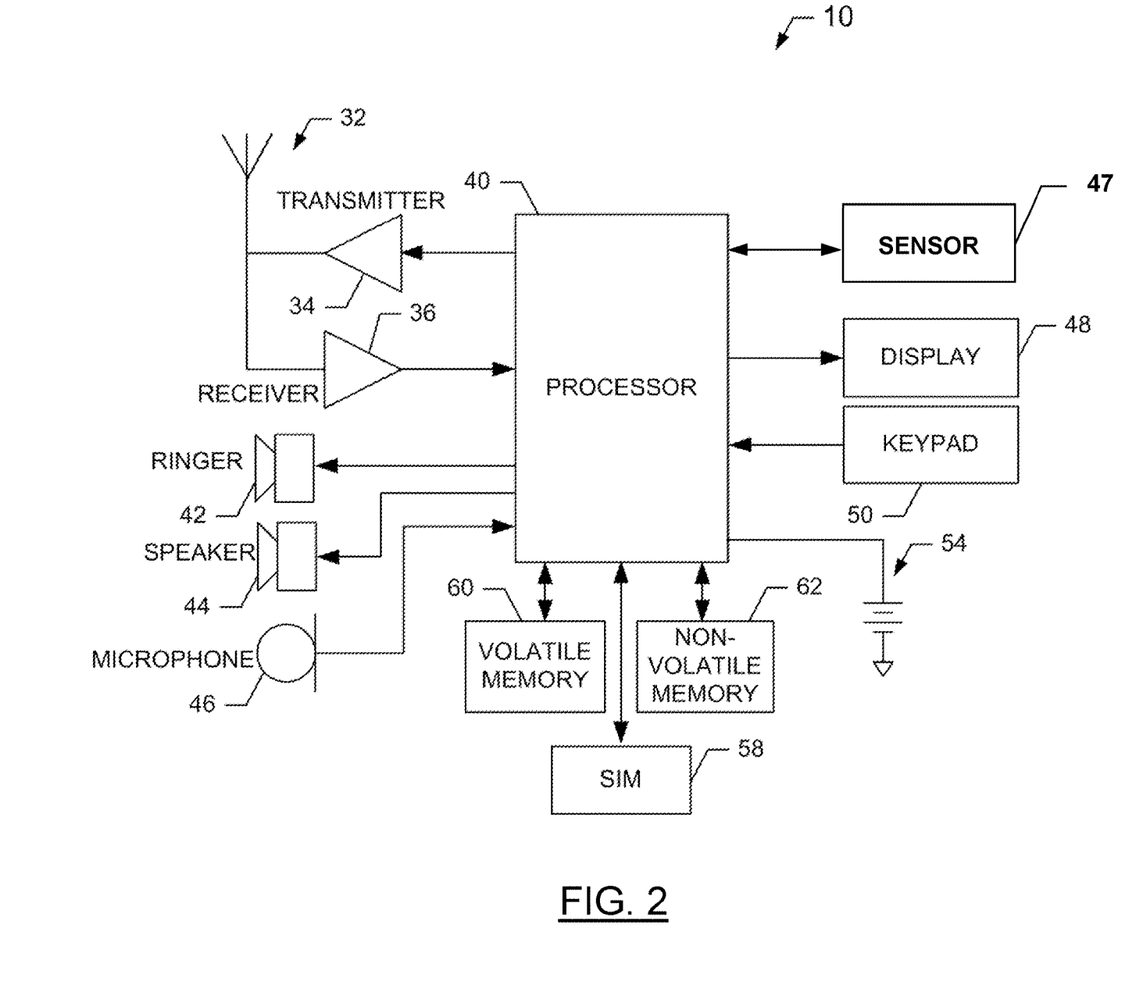
FIG. 2 is a schematic block diagram of a mobile device that may be configured according to an example embodiment of the present invention.

Although the mobile terminal 10 may be configured in various manners, one example of a mobile terminal that could benefit from an example embodiment of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops, tablet computers, or mobile computers), cameras, audio/video players, radio, global positioning system (GPS) devices, or any combination of the aforementioned, and other types of communication devices, may employ example embodiments of the present invention. As described, the mobile terminal may include various means for performing one or more functions in accordance with an example embodiment of the present invention, including those more particularly shown and described herein. It should be understood, however, that a mobile terminal may include alternative means for performing one or more like functions, without departing from the spirit and scope of the present invention.

The mobile terminal 10 illustrated in FIG. 2 may include an antenna 32 (or multiple antennas) in operable communication with a transmitter 34 and a receiver 36. The mobile terminal may further include an apparatus, including at least one processor 40 and at least one memory. Among other functions, the processor provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM (Global System for Mobile Communications) and IS-95, or with third-generation (3G) wireless communication protocols, such as UMTS (Universal Mobile Telecommunications System), CDMA (Code Division Multiple Access) 2000, wideband CDMA (WCDMA) and time division-synchronous CDMA (TD-SCDMA), with 3.9G wireless communication protocols such as E-UTRAN (evolved-UMTS (Universal Mobile Telecommunications System) terrestrial radio access network), with fourth-generation (4G) wireless communication protocols or the like.

It is understood that the apparatus, such as the processor 40, may include circuitry implementing, among others, audio and logic functions of the mobile terminal 10. The processor 40 may be embodied in a number of different ways. For example, the processor 40 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, the processor 40 may be configured to execute instructions stored in the memory device 62 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal) adapted for employing embodiments of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 10 may also comprise a user interface including an output device such as an earphone or speaker 44, a ringer 42, a microphone 46, a display 48, and a user input interface, which may be coupled to the processor 40. The mobile terminal 10 may further include sensor(s) 47 for detecting a stimulus such as a button for detecting a depression, a touch sensitive display for detecting a touch, a light sensor for detecting light levels, a proximity sensor to detect an input without requiring a touch, a pressure sensor to detect barometric pressure, a temperature sensor to detect ambient temperature, or a motion sensor to detect motion, etc. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication.

As further described below, example embodiments of the present invention may be implemented in conjunction with a variety of operational states of a mobile terminal, such as mobile terminal 10. The operational states may include varying degrees of functionality with varying levels of user interaction available. For example, a first operational state may include a state in which a device is in a locked mode. A locked mode may include a mode to preclude unintended user input and/or to preclude access to an unauthorized user. As such, the term "locked" may refer to a mode in which user input is generally locked and precluded other than a particular sequence to exit the locked mode. The sequence may be a user-generated code, a biometric input (e.g., fingerprint, palm scan, retinal scan, etc.), a pattern drawn on a touch screen, a specific movement of the device (e.g., in a figure-eight pattern), etc. Other operational states may include varying degrees of functionality, such as a music-player operational state in which a user may adjust volume, song, album, playlist, etc., but may not be able to use other functions of the mobile terminal. An operational state may also include a fully-functional operational state in which all of the functions of a device are available for use and all types of user inputs are available.

According to example embodiments of the present invention, operational states may include a state in which one type of user input may be available (e.g., a voice command input) while another type of user input is unavailable (e.g., a touch input or key-press input). The operational states of example embodiments may also provide differing functionality such as text-messaging (e.g., SMS messaging) or voice calls may be available, while web browsing or a camera/photo album may be unavailable. As will be appreciated, given the vast functionality of devices of example embodiments, and the various input types available (audio input, touch input, motion input, proximity (hovering) input, etc.), operational states may include countless combinations or permutations of available functionality and available types of user inputs such that the aforementioned and following examples are merely examples of such states and should not be construed as limiting. Further, while some input types may be precluded in various operational states, certain input sequences may be enabled of a precluded user input type. For example, a touch input type may be precluded in a particular operational state; however, a specific "unlock" sequence may be available through a touch input type to change the operational state of the device. Thus, while various input types may be generally precluded in various operational states, some exceptions may be present in order to change operational states.

Input types, as referred to herein, describe generally groups of inputs that are made in a similar manner that is distinct from the inputs of other input types. For example, a motion input type is distinct from an audio input type. However, there are further input types within these generally described input types. Audio input types may include a speech input type where a user speaks instructions or input to a device, a "snap" input type, where a user may use finger snaps to provide input to a device, a whistle input type, where a user may whistle different tunes, pitches, or sequences in order to provide input to a device, etc. Optionally, an audio input type may include directional determination of the audio input source. In such an embodiment, the direction from which the audio input type is received may be considered in determining how the audio input type is interpreted by the mobile terminal 10. Similarly, a motion input type may include a gesture input type where a user may move a device in a gesture or path that is interpreted by the device as an input. Optionally, a motion input type may include a tap input type where a device responds to various frequencies and degrees of tapping of the device. Thus, while input types may be described generally herein as motion, audio, proximity, touch input types, it is appreciated that there are various other input types available within these general input types, and in addition to these input types.

In general, example embodiments of the present invention provide for a method, apparatus, and computer program product for entering an operational state that restricts the type of input accepted based upon the type of input received to enter the operational state.

Mobile terminals, such as mobile terminal 10, may comprise various form factors and sizes with a wide variety of functionality that enables them to be used in a multitude of ways in a variety of contexts beyond that of a conventional cellular telephone. For example, a device may be used as a music player, a telephone, a personal digital assistant for scheduling, email, etc, gaming, or any variety of uses. Some of these uses may require different levels of user input with the mobile terminal 10. According to one embodiment, a user may have a device in their pocket with a headset peripheral (e.g., a wired headset or Bluetooth® headset). The user may wish to operate the device, but only using voice commands as without visibility to the display, a touch input type through a display or keys may be difficult. In such an embodiment, the device may be used in an operational state that enables an audio input type while generally precluding a touch input type.

According to another example embodiment, a user may be in a dark theater, but they may want to use their device without disturbing others in the theater, either by speaking commands through an audio input type through microphone 46 or by illuminating the display 48 for a touch input type. Accordingly, the user may wish to interact with the mobile terminal 10 in an operational state that enables motion input type, but generally precludes an audio input type or a touch input type. In such an embodiment, the operational state may enable haptic feedback through the device, such as through a vibration mechanism, without illuminating the display.

According to some embodiments, the context of a device may be considered when entering an operational state. A device context, such as the context of mobile terminal 10, may be determined by one or more sensors 47 and processor 40. For example, a context may include where the mobile terminal 10 is in a dark environment as detected through an image sensor or through a light sensor. A device may determine if the environment is noisy through microphone 46, detecting, for example, wind noise, crowd noise, the noise at a concert, background noise, etc. A device may determine that it is in a rough/vibrating context, such as on the dashboard of a vehicle on a rough road via an accelerometer or motion sensor. A device may also determine context through patterns, such as determining through a pattern of motion that the device is being carried by someone who is running (e.g., hand held, attached to an arm strap, or in a pocket) through repeated or rhythmic forward/backward movements. A device may also determine, such as via a motion sensor or GPS sensor, for example, that the device is moving at a high rate, such as in a car, plane, bus, or other vehicle. The context of a device may be used to facilitate entry into an operational state as will be described further below. Additionally, while a number of contexts are described above, it will be appreciated that a great number of contexts can be determined through various sensors of a mobile terminal 10 that will provide context to aid operational state determination, not limited to those described above.

As described above, it may be desirable for a device such as mobile terminal 10 to operate in a variety of operational states. Example embodiments described herein are directed to methods, apparatuses, and computer program products, to facilitate entry into an operational state that is based on the type of input received by the device, and may consider the context of the device when determining the operational state to enter.

First Example Implementation

According to an example embodiment, a user may be jogging with a mobile terminal 10 and may want to interact with a music player of the device without having to view a display 48 of the mobile terminal 10 and interact with the display. Before the user begins to run, they may view the display, start a music player application, and begin listening to music, via speaker 44 or through peripheral headphones or speakers, as they begin their run. The mobile terminal 10 may be operating in a first operational state, in which the device is in a "locked" mode in which it is configured to only respond to a predetermined input sequence of one or more input types in order to change the operational state. A user may have placed the mobile terminal 10 in this operational state, or the device may "time-out" or enter this operational state after a predetermined amount of time without receiving an input. The user may want to interact with the mobile terminal such that they need to change the operational state of the mobile terminal in order to do so. If the user does not wish to interrupt their run or be distracted from their run, they may provide a motion input to the mobile terminal 10 that is detected by a motion sensor, such as sensor 47. While the motion sensor may be detecting the rhythmic motion of the running user, a motion input, distinct from the rhythmic motion, may provide an input to the device. For example, the user may double-tap or triple-tap the mobile terminal 10, a movement distinct from the rhythmic running motion that can be detected by the motion sensor. Upon receiving the detected motion input type, the device may enter a second operational state, where the second operational state is entered based on the input type received by the mobile terminal. In the instant embodiment, the motion input type may dictate the second operational state.

The second operational state of the mobile terminal 10 may enable user input of the motion input type, while generally precluding input of other input types. For example, a user may have belabored breathing during the run such that an audio type input may be ineffective at responding to spoken words through the belabored breathing. Further, a touch input type of a touchscreen display 48 or keypad 50 may be precluded as the mobile terminal 10 may be in a pocket, strapped to an arm, or be carried in a hand such that any accidental touching of the display or keys can be ignored. In this second operational state, a motion type input may be enabled to allow the user to interact with the device in the selected operational state. With the music player playing, and operating in the second operational state, a double-tap of the mobile terminal 10, as detected by sensor 47, may fast-forward a song, while a triple-tap may rewind a song. Different sequences of taps may be interpreted as different inputs to enable interaction with the mobile terminal 10 in the second operational state. Further, as the touch input type is generally precluded in this second operational state, a motion input type such as a tap that is received on a touchscreen display, button, or key can be interpreted as the motion input type and the touch input type of the screen, button, or key, can be ignored. In such an embodiment, a user is not inconvenienced by tapping on the mobile terminal 10 in an area that can elicit another function.

According to some embodiments, the context of the mobile terminal 10 may be considered when determining and entering an operational state. Using the example embodiment above, the mobile terminal 10, through sensor 47, may detect that the user is running. Using this context, the motion input type received may be considered when determining the second operational state. The second operational state may include a state in which the rhythmic movement of the mobile terminal 10 indicative of running may be ignored as a user input since it is repetitive, while the tapping motion input type may be interpreted by the mobile terminal as a user input. Optionally, in the example embodiment, the rhythmic movement of the mobile terminal may be considered as a user input, with the rhythmic frequency being the input. An increase in rhythmic frequency may change the music played to a more up-tempo or faster-paced music selection.

Second Example Implementation

Another example embodiment may include where a user is driving and wants to interact with the mobile terminal 10. The mobile terminal 10 may be in a first operational state, such as a locked mode as described above. The user may provide an audio input to the mobile terminal, for example, through microphone 46, to enter a second operational state. The audio input provided by the user may include, for example, a snapping of the fingers near the device, clapping of the hands, or speaking a particular word or phrase. The mobile terminal 10 may interpret the audio input as the sequence to exit the first operational state and to enter a third operational state. The third operational state may enable user input of an audio input type, but may preclude motion input type or touch input type. The user may speak commands to the mobile terminal to perform a variety of tasks, such as to draft and send an email or text message, or to find directions to a destination. The third operational state may be determined based on the input type received, which in the instant example is an audio type input.

While the third operational state may be determined based on the input type received in the above-described embodiment, according to some embodiments, the context may also be considered. For example, the mobile terminal 10, through a motion sensor, GPS receiver, or through wireless access points, may determine that it is moving at a rate of speed indicative of traveling in a vehicle. The GPS receiver, in concert with a mapping application, may determine that the vehicle is traveling along a road, so it is likely to be a car, truck, bus, etc. In such a context, the mobile terminal 10 may, in combination with the user input (e.g., the audio input type), determine that a touch input type is precluded as the user may be driving a vehicle. This context and user input type may combine to determine the third operational state that is entered in response to the user input type and the context.

As described above, an operational state may be determined based on an input type received at a device, and may further consider the context of the device. While the embodiments described above are directed to the type of input available for user interaction based on the operational state, the operational states may also dictate how information is conveyed back to a user. The manner of conveying information to a user may be a part of the operational state that is determined by the user input type and possibly by the context.

Using the above-described example of a user that is presumed to be traveling in a vehicle, the operational state that is entered with an audio input type may disable output of the mobile terminal 10 to the display 48 in order to minimize distractions should the user be driving a vehicle. Further, in the example embodiment of a user running and using a touch input type, the display 48 may also be disabled, with information conveyed to a user via audio feedback. For example, if a text message is received by the running user while they are running, a motion input type at the mobile terminal 10 may cause the text message to be read to the user via speaker 44 or a peripheral audio output. In an example embodiment in which a user provides a motion input type to a mobile terminal 10, and the mobile terminal detects a dark context that could be indicative of a dark theater, a pocket, or the like, the mobile terminal 10 may limit output information to haptic feedback. For instance, a double tap of the mobile terminal 10 may be interpreted as an input for the number of unread email messages, in which case the mobile terminal may respond with a number of haptic feedback pulses indicative of the number of unread email messages. Such an output would be easily discernible by a user and would provide information to a user without the use of an illuminated display or an audio output, both of which could be detrimental in certain circumstances.

Third Example Implementation

While the aforementioned example embodiments include operational states that involve interaction with a mobile terminal 10 using a particular input type, operational states may include a state in which different input types provide interaction with different features of the mobile terminal 10. In such an example embodiment, a user may cause the mobile terminal 10 to transition from a first operational state (e.g., a locked state), to a second operational state by, for example, snapping their fingers proximate the mobile terminal 10. The second operational state may enable user input of an audio input type, which may be limited to certain types of audio input (e.g., finger snaps, claps, etc.), but may also enable user input of a second input type, such as a motion input type. The different input types available may be configured to operate different functions of the mobile terminal 10. For example, the audio input type may be configured to enable user interaction with a music player application. A user may skip forward a music track with a single snap, or rewind a music track with a double-snap (e.g., two snaps received within a predetermined amount of time of one another). Other audio input type inputs may be available to a user as will be appreciated by one of ordinary skill in the art in view of the aforementioned disclosure. Meanwhile, a second function of the mobile terminal 10, such as a navigation application, may detect user input of a motion input type. In such an example, a movement of a device from a first location toward pointing in a second direction may direct the mobile terminal to determine the direction in which the mobile terminal 10 is pointed, and to communicate such information to a user. The mobile terminal 10 may further be configured to alert the user to points of interest in the direction the mobile terminal 10 is now pointed. As described, each of the aforementioned functions of the mobile terminal 10 may be interacted with by different input types. Further, according to the aforementioned examples, the user may not need to interact with a display of the device in order to perform these functions.

Fourth Example Implementation

A further example implementation may include an example in which the language of a user input may be considered when determining the operational state. For example, a user input type of speech input may be of a first language in which an operational state is entered with the first language as the language of audio output. A user input type of a second speech input of a second language may cause another operational state to be entered in which interaction (e.g. user input and device output) may be conducted in the second language. Similarly, input on a touch-type display of a touch input type may be detected with a corresponding language. If the input is a word or a specific alphabetic or numerical character that is language-specific, the mobile terminal 10 may enter an operational state in which the determined language is used for interaction with the mobile terminal. In this manner, a mobile terminal 10 may be configured to be poly-lingual for use among different users, or use by a single user who uses multiple languages.

Thus, according to example embodiments, an operational state may include an information output type that is permitted, and an information output type that is precluded. Information output types of mobile terminals 10 of example embodiments may include output types of visible displays, visual output (e.g., light emitting devices—LEDs, strobe lights, etc.), audio output (e.g., audio output to speaker 46, peripheral audio headsets or speakers, etc.), haptic output (e.g., vibrations, pulses, etc.), olfactory outputs, or the like.

While the above-described example embodiments describe a user input of a particular input type being available to a user when in an operational state, according to some embodiments of the present invention, the operational state may include functionality enabling a change of the available user input type based on certain input received at the mobile terminal 10, such as an environmental condition. According to one example of such an embodiment, an operational state may be entered by an audio input type. The mobile terminal may respond and function according to input received in an audio input type. However, the user and mobile terminal 10 may enter a location where the ambient noise is too loud for audio input types to be accurately determined by the mobile terminal, or the user may be uncomfortable attempting to overcome the ambient noise with an audio input type. In such an embodiment, the operational state may be configured to change the available user input type from an audio input type to a motion input type in response to the ambient noise level exceeding a predetermined volume. The environmental conditions may include a variety of conditions such as excess vibration (e.g., while riding on a bus) such that a motion input type may be precluded based on the excess vibration. Another environmental condition may include where a device is receiving pressure along a portion of a touch screen, such as in the pocket of a user. In such an embodiment, a touch input type may be transitioned to a motion input type as the touch input type may be unreliable.

Figure 3:
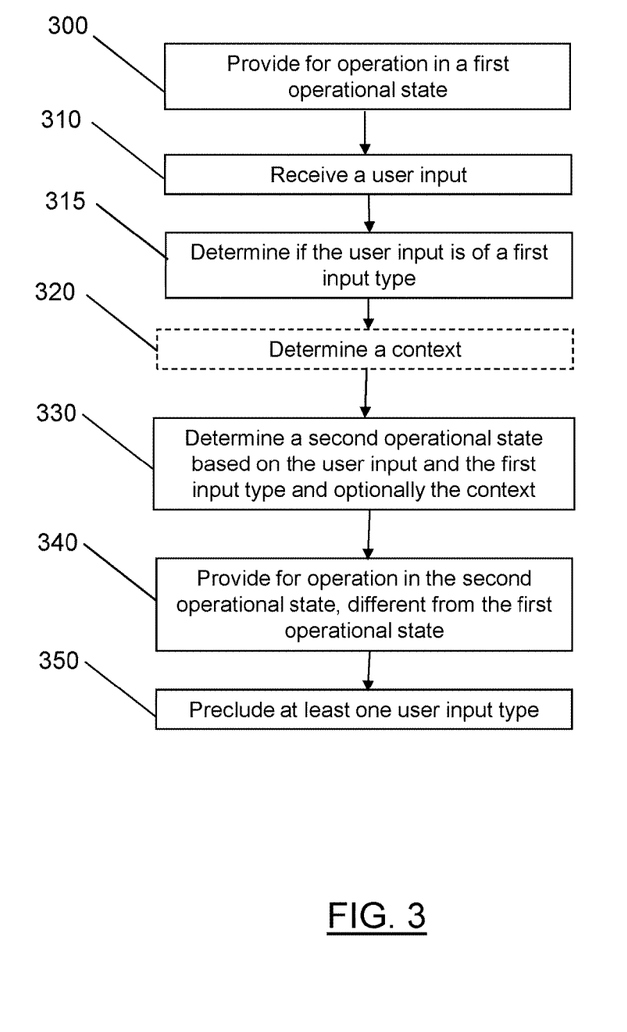
FIG. 3 is a flowchart of a method of providing various operational states based on user input type according to an example embodiment of the present invention.

FIG. 3 illustrates a flowchart of a method of operating a mobile terminal according to an example embodiment of the present invention. An apparatus embodied by the mobile terminal, and more particularly, the processor 40, the display 48, or the like, may be configured to provide for operation in a first operational state of a device, such as mobile terminal 10, at 300. A user input may be received at 310. A determination may be made at 315 as to whether the user input is of a first input type. A second operational state may be determined based on the user input and the first input type at 330 in response to the user input being of the first input type. The method may further provide for operation in the second operational state, different from the first operational state at 340 in response to receiving the user input of the first input type. The second operational state may preclude at least one user input type as depicted at 350.

FIG. 3 further illustrates operations which may or may not be implemented in conjunction with example embodiments of the present invention. Operation 320 of the flowchart of FIG. 3 is illustrated in broken lines to illustrate the optional nature of the operations. As illustrated at operation 320, the apparatus embodied by mobile terminals according to some example embodiments may be configured to determine a context. The context may include an ambient light level, an ambient temperature, a time of day, a motion context, a location context, etc.

As described above, FIG. 3 is a flowchart illustrating operations performed by or in relation to a mobile terminal of an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 3, described further below, may comprise a processor (e.g., the processor 40) configured to perform some or each of the operations (300-350) described below. The processor may, for example, be configured to perform the operations (300-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-350 may comprise, for example, the processor 40 and/or a device or circuit for executing instructions or executing an algorithm for processing information as described further below.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the tangible, non-transitory storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and associated drawings describe example embodiments in the context of certain example combinations of elements and/or functions, it should be appreciated that different combinations of elements and/or functions may be provided by alternative embodiments without departing from the spirit and scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
providing for operation of a device in a locked state;
defining at least two unlocking user inputs having different input types, the respective input types of the at least two unlocking user inputs comprising at least one of motion input, audio input, or touch input, wherein the device is responsive to all of the at least two unlocking user inputs for unlocking the device from the locked state;
receiving an unlocking user input indicative of an unlock operation;

determining an unlocking input type of the unlocking user input; in response to receiving the unlocking user input of any of the at least two unlocking user inputs, transitioning a state of the device from the locked state to an unlocked state;

in an instance the unlocking user input is of a first input type, in the unlocked state, responsive to receiving the unlocking user input, responding to subsequent inputs of the first input type, and precluding responsiveness to other inputs of all of the other of at least two of the respective input types of the at least two unlocking inputs for unlocking the device from the locked state that are not of the first input type; and in an instance the unlocking user input is of a second input type, in the unlocked state, responsive to receiving the unlocking user input, responding to subsequent inputs of the second input type, and precluding responsiveness to other inputs of all of the other of at least two of the respective input types of the at least two unlocking inputs for unlocking the device from the locked state that are not of the second input type.

2. The method according to claim 1, wherein the unlocking user input is the motion input, and wherein in the unlocked state, responsiveness to audio input is precluded.

3. The method according to claim 1, wherein the unlocking user input is the motion input, and wherein in the unlocked state, responsiveness to touch input is precluded.

4. The method according to claim 1, wherein the unlocking user input is the audio input, and wherein in the unlocked state, responsiveness to touch input is precluded.

5. The method according to claim 1, wherein the unlocking user input is the audio input, and wherein in the unlocked state, responsiveness to motion input is precluded.

6. The method according to claim 1, wherein the unlocking user input is the touch input, and wherein in the unlocked state, responsiveness to touch input is precluded.

7. The method according to claim 1, wherein the unlocking user input is the touch input, and wherein the method further comprises, in the unlocked state, precluding responsiveness to motion input.

8. An apparatus comprising at least one processor and at least one memory including computer program code, the at least one memory and the computer program code configured to, with the processor, cause the apparatus to at least:

provide for operation of a device in a locked state;

define at least two unlocking user inputs having different input types, the respective input types of the at least two unlocking user inputs comprising at least one of motion input, audio input, or touch input, wherein the device is responsive to all of the at least two unlocking user inputs for unlocking the device from the locked state;

receive an unlocking user input indicative of an unlock operation;

determine an unlocking input type of the unlocking user input; in response to receiving the unlocking user input of any of the at least two unlocking user inputs, transition a state of the device from the locked state to an unlocked state;

in an instance the unlocking user input is of a first input type, in the unlocked state, responsive to receiving the unlocking user input, respond to subsequent inputs of the first input type, and preclude responsiveness to other inputs of all of the other of at least two respective input types of the at least two unlocking inputs for unlocking the device from the locked state that are not of the first input type; and in an instance the unlocking user input is of a second input type, in the unlocked state, responsive to receiving the unlocking user input, respond to subsequent inputs of the second input type, and preclude responsiveness to other inputs of all of the other of at least two of the respective input types of the at least two unlocking inputs for unlocking the device from the locked state that are not of the second input type.

9. The apparatus according to claim 8, wherein the unlocking user input is the motion input, and wherein in the unlocked state, responsiveness to audio input is precluded.

10. The apparatus according to claim 8, wherein the unlocking user input is the motion input, and wherein in the unlocked state, responsiveness to touch input is precluded.

11. The apparatus according to claim 8, wherein the unlocking user input is the audio input, and wherein in the unlocked state, responsiveness to touch input is precluded.

12. The apparatus according to claim 8, wherein the unlocking user input is the audio input, and wherein in the unlocked state, responsiveness to motion input is precluded.

13. The apparatus according to claim 8, wherein the unlocking user input is the touch input, and wherein in the unlocked state, responsiveness to audio input is precluded.

14. The apparatus according to claim 8, wherein the unlocking user input is the touch input, and wherein in the unlocked state, responsiveness to motion input is precluded.

15. A computer program product comprising at least one non-transitory computer-readable storage medium having computer-executable program code instructions stored therein, the computer-executable program code instructions comprising program code instructions to:

provide for operation of a device in a locked state;

define at least two unlocking user inputs having different input types, the respective input types of the at least two unlocking user inputs comprising at least one of motion input, audio input, or touch input, wherein the device is responsive to all of the at least two unlocking user inputs for unlocking the device from the locked state;

receive an unlocking user input indicative of an unlock operation;

determine an unlocking input type of the unlocking user input; in response to receiving the unlocking user input of any of the at least two unlocking user inputs, transition a state of the device from the locked state to an unlocked state;

in an instance the unlocking user input is of a first input type, in the unlocked state, responsive to receiving the unlocking user input, respond to subsequent inputs of the first input type, and preclude responsiveness to other inputs of all of the other of at least two respective input types of the at least two unlocking inputs for unlocking the device from the locked state that are not of the first input type; and in an instance the unlocking user input is of a second input type, in the unlocked state, responsive to receiving the unlocking user input, respond to subsequent inputs of the second input type, and preclude responsiveness to other inputs of all of the other of at least two of the respective input types of the at least two unlocking inputs for unlocking the device from the locked state that are not of the second input type.

16. The computer program product according to claim 15, wherein the unlocking user input is the motion input, and wherein in the unlocked state, responsiveness to audio input is precluded.

17. The computer program product according to claim 15, wherein the unlocking user input is the motion input, and wherein in the unlocked state, responsiveness to touch input is precluded.

18. The computer program product according to claim 15, wherein the unlocking user input is the audio input, and wherein in the unlocked state, responsiveness to touch input is precluded.

19. The computer program product according to claim 15, wherein the unlocking user input is the audio input, and wherein in the unlocked state, responsiveness to motion input is precluded.

\* \* \* \* \*